(12) United States Patent
Macken et al.

(10) Patent No.: US 12,158,582 B2
(45) Date of Patent: Dec. 3, 2024

(54) OPTICAL ARRANGEMENT FOR A DISPLAY

(71) Applicant: BAE SYSTEMS plc, London (GB)

(72) Inventors: Ian Thomas Macken, Rochester (GB); Jonathan Paul Freeman, Rochester (GB); Rory Thomas Alexander Mills, Rochester (GB)

(73) Assignee: BAE SYSTEMS PLC, London (GB)

( * ) Notice: Subject to any disclaimer, the term of this patent is extended or adjusted under 35 U.S.C. 154(b) by 525 days.

(21) Appl. No.: 17/594,418

(22) PCT Filed: Mar. 18, 2020

(86) PCT No.: PCT/GB2020/050696
§ 371 (c)(1),
(2) Date: Oct. 15, 2021

(87) PCT Pub. No.: WO2020/212684
PCT Pub. Date: Oct. 22, 2020

(65) Prior Publication Data
US 2022/0179217 A1 Jun. 9, 2022

(30) Foreign Application Priority Data

Apr. 18, 2019 (EP) .................................... 19275054
Apr. 18, 2019 (GB) .................................... 1905525

(51) Int. Cl.
*G02B 27/01* (2006.01)
*G02B 17/08* (2006.01)

(52) U.S. Cl.
CPC ....... *G02B 27/0172* (2013.01); *G02B 17/086* (2013.01); *G02B 2027/013* (2013.01); *G02B 2027/0178* (2013.01)

(58) Field of Classification Search
None
See application file for complete search history.

(56) References Cited

U.S. PATENT DOCUMENTS

| 4,969,724 A | 11/1990 | Ellis |
| 5,093,567 A | 3/1992 | Staveley |
(Continued)

FOREIGN PATENT DOCUMENTS

| EP | 1089111 B1 | 3/2005 |
| WO | 9964914 A1 | 12/1999 |
(Continued)

OTHER PUBLICATIONS

International Search Report and Written Opinion received for PCT Application No. PCT/GB2020/050696. Mail date: May 6, 2020. 33 pages.

(Continued)

*Primary Examiner* — Bao-Luan Q Le
*Assistant Examiner* — Danell L Owens
(74) *Attorney, Agent, or Firm* — Finch & Maloney PLLC

(57) ABSTRACT

A folded optical arrangement for use in a look-through display to transmit an image from an image plane to a user's eye, the arrangement providing a folded optical transmission path and comprising: an optical system having a first optical element comprising a first plurality of optically powered surfaces; and a second optical element comprising at least one optically powered surface, the optical system configured to receive light forming the image from an image source, and to focus the light to have an apparent optical focus between a predetermined distance and optical infinity and output the light; wherein the first plurality of optically powered surfaces and the at least one optically powered surface of the second optical element are arranged to define a plurality of interfaces along the folded optical path and wherein a refractive index change at each interface is predetermined to control the direction of light passing through the or each interface; and wherein one surface of the first optical element and one surface of the second optical (Continued)

element are adjacent to one another and the adjacent surfaces are dissimilar and each define an angle with a respective other surface of the relevant optical element at opposing ends of the adjacent surfaces and wherein the opposing angles are not equal; and a combiner element located to receive the output light from the optical system and a further external image for combination for transmission to the user.

20 Claims, 14 Drawing Sheets

(56) References Cited

U.S. PATENT DOCUMENTS

| | | | |
|---|---|---|---|
| 2002/0036831 A1 | 3/2002 | Inoguchi et al. | |
| 2006/0098293 A1 | 5/2006 | Garoutte et al. | |
| 2014/0293434 A1* | 10/2014 | Cheng | H04N 13/363 |
| | | | 359/630 |
| 2015/0228120 A1 | 8/2015 | Osterhout et al. | |
| 2016/0103306 A1* | 4/2016 | Takahashi | G02B 17/086 |
| | | | 359/716 |
| 2019/0278087 A1 | 9/2019 | Cheng et al. | |
| 2022/0317449 A1 | 10/2022 | Freeman et al. | |

FOREIGN PATENT DOCUMENTS

| | | |
|---|---|---|
| WO | 02/099507 A1 | 12/2002 |
| WO | 2013112705 A1 | 8/2013 |
| WO | 2015134738 A1 | 9/2015 |
| WO | 2018103551 A1 | 6/2018 |
| WO | 2020212683 A1 | 10/2020 |
| WO | 2020212684 A1 | 10/2020 |

OTHER PUBLICATIONS

GB Search Report under Section 17(5) received for GB Application No. 1905525.0, dated Sep. 25, 2019. 3 pages.
Extended European Search Report received for EP Application No. 19275054.5, dated Oct. 30, 2019. 10 pages.
International Preliminary Report on Patentability received for PCT Application No. PCT/GB2020/050696. Date of Issue: Sep. 28, 2021. 9 pages.
International Search Report and Written Opinion received for PCT Application No. PCT/GB2020/050681. Mail date: May 6, 2020. 34 pages.
GB Search Report under Section 17(5) received for GB Application No. 1905528.4, dated Sep. 25, 2019. 3 pages.
Extended European Search Report received for EP Application No. 19275055.2, dated Oct. 30, 2019. 10 pages.
International Preliminary Report on Patentability received for PCT Application No. PCT/GB2020/050681. Date of Issue: Sep. 28, 2021. 10 pages.

* cited by examiner

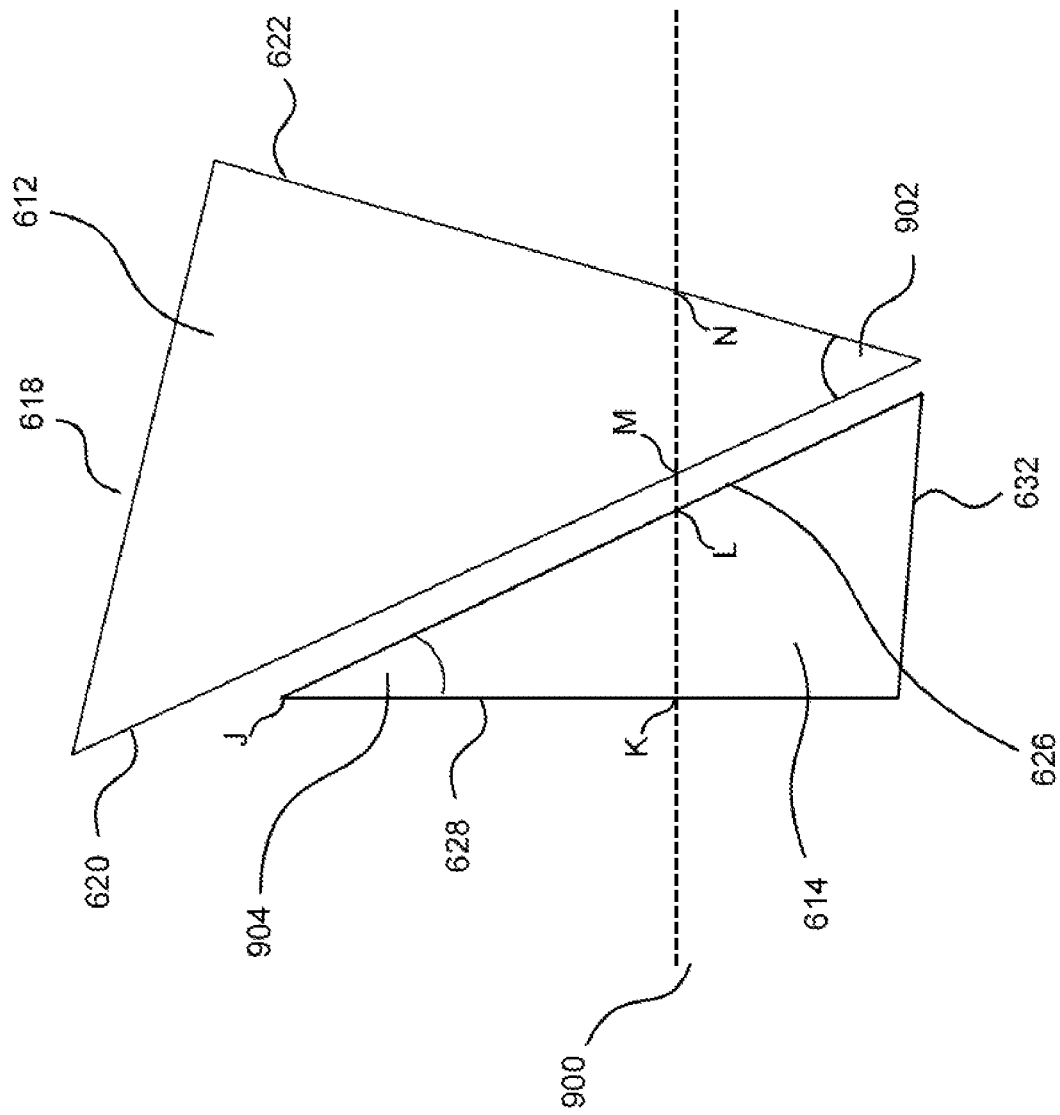

OPTICAL ARRANGEMENT FOR A DISPLAY

BACKGROUND

The present invention relates to improvements in or relating to optics for use displays such as in head-mounted displays; head-worn displays; and/or Heads Up Displays.

Some displays, such as head-mounted displays (HMDs); head-worn displays (HWDs); or Heads Up Displays (HUD) are targeted to be as small and lightweight as possible. An example HMD 100 is illustrated in FIG. 1.

HMDs, such as HMD 100, are wearable by a user by means of an appropriate support 102. The support includes one or more optical elements 104 which can be viewed by one of both eyes of the user. Although not shown in detail, the optical elements 104 include a substantially transparent display medium. The user is able to view the exterior environment through the optical elements 104. The user is also able to view images relayed to the eye of the user in use via the HMD.

In conventional systems, images are relayed to the eye of the user in use using lens trains or folded optical designs. Lens trains or folded optical designs are incorporated into the HMD 100. Traditionally, lens trains or folded optical designs are incorporated within the support 102 of the HMD 100.

Traditional optical lens trains are linear and non-folded for simplicity. Multiple elements are usually used to achieve the performance required. For this reason, they are not particularly suitable for use in modern HMDs that are required to be compact, lightweight, and optimised for anthropometric data.

Traditional folded optical designs can be more compact, but can also introduce light loss mechanisms, reducing system efficiency. One of the simplest folded optical designs consists of an optical arrangement. An example of an optical arrangement 200 is shown in FIG. 2.

The optical arrangement 200 comprises a beamsplitter 202 and a spherical combiner 204. In use, images are directed from a display source 206 or relay lens onto the beamsplitter 202. The beamsplitter 202 partially reflects the images onto the concave surface of the spherical combiner 204. The spherical combiner 204 reflects a collimated exit pupil through the beamsplitter 202 towards the user's eye 208.

However, if used in a HMD the optical arrangement 200 has to be adapted to enable the user to view the exterior environment 210. To do this, the beamsplitter 202 and spherical combiner 204 must be at least semi-transparent. As a result, some image source light is lost upon interaction with each element, as light is lost when only partial reflection occurs. Therefore the image presented to the eye is dimmer than desired. In addition, the light must pass twice through the beamsplitter 202, and this also increases the losses and can introduce ghost images.

A further disadvantage of optical arrangements 200 is that they are often not sufficiently lightweight and compact. The geometry of the beamsplitter 202 and spherical combiner 204 have to be matched to the exit pupil requirement, and so have to be sufficiently large cater for the required anthropometric range thereby increasing the size of the optical geometry.

An improvement to the birdbath optical arrangement is provided in expired U.S. Pat. Nos. 5,093,567 and 4,969,724. These patents show folded optical arrangements having multi-part folded eyepiece and relay lens assemblies.

An example of a known folded optical arrangement 300 found in these patents is shown in FIG. 3. The optical arrangement 300 has a compact eyepiece in an off-axis solid arrangement. The arrangement 300 comprises a wedge 302, prism 304, and cemented makeup piece 306. The prism 304 receives an image from a relay lens 308 or display source. The wedge 302 and prism 304 together form a collimated image for viewing by the user's eye 310. The makeup piece 306 optically manipulates light to counteract the effects of the prism 304 and wedge 302 so that the user can correctly view the exterior environment 312.

As can be seen in FIG. 3, the prism makes use of a transmission surface and a conventional curved combiner surface. Similarly, the wedge has two transmission surfaces. The make-up piece also has a surface matched to the combiner surface of the prism.

While the folded optical arrangement 300 solves some of the problems identified with the optical arrangement 200, new issues can be introduced. For example, the optical arrangement 300 of FIG. 3 contains off-axis components of simple surface form, for example spherical and cylindrical surfaces, which cause residual aberrations in the viewed image such as astigmatism and distortion.

Additionally the optical arrangement 300 of FIG. 3 is ideally suited for use with an image source of controlled numerical aperture (NA). In such arrangements, a relay lens with internal hard-stop is used to vignette unwanted light/rays to control the size of the resultant system exit pupil.

However, if such an optical arrangement is paired with a flat panel display, emissive display or direct image source with uncontrolled NA (excluding the use of a relay lens), the exit pupil size may not be controlled and unwanted light can propagate through the optical system resulting in a larger exit pupil which may not be fully corrected to remove aberrations. In FIG. 3 the unwanted light is shown by reference numeral 314. In this scenario, if the user's pupil is axially aligned to the centre of the exit pupil the display appears well corrected. Disadvantageously, movement of the eye or optical arrangement results in the user viewing areas of the exit pupil with mainly uncorrected light. In these areas, the image may appear blurry, distorted, or incorrect, and this is a clear disadvantage in a high performance conformal display.

Accordingly, one object of the present invention is to overcome the problems of existing folded optical arrangements for use in HMDs.

SUMMARY

According to an aspect of the present invention there is provided a folded optical arrangement for use in a look-through display to transmit an image from an image plane to a user's eye, the arrangement providing a folded optical transmission path and comprising: an optical system having a first optical element comprising a first plurality of optically powered surfaces; and a second optical element comprising at least one optically powered surfaces, the optical system configured to receive light forming the image from an image source, and to focus the light to have an apparent optical focus between a predetermined distance and optical infinity and output the light; wherein the first and second plurality of optically powered surfaces are arranged to define a plurality of interfaces along the folded optical path and wherein a refractive index change at each interface is predetermined to control the direction of light passing through the or each interface; and wherein one surface of the first optical element and one surface of the second optical element are adjacent to one another and each define an angle with a respective other surface of the relevant optical element at opposing ends of the adjacent surfaces and wherein the opposing angles are not equal; and a combiner element located to receive the output light from the optical system and a further external image for combination for transmission to the user.

Preferably, the combiner comprises an optically powered surface.

Preferably, the combiner comprises a plurality of stacked combiner elements to expand the effective exit pupil of the system.

Preferably, the combiner comprises at least one of a reflective, refractive, holographic and diffractive element.

Preferably, the first optical element comprising at least three optically powered surfaces.

Preferably, the first optical element is a three surface prism.

Preferably, the first optical element comprises a single-piece three-sided element having an elongate, substantially triangular cross-section.

Preferably, the second optical element comprising at least two optically powered surfaces.

Preferably, wherein the second optical element is a wedge.

Preferably, the second optical element comprising an elongate element having quadrilateral cross-section.

Preferably, the first optical element and the second optical element are arranged in juxtaposition with one another so that at least one optically powered surface of each is substantially aligned.

Preferably, the at least one optically powered surface of each optical element is separated by a gap.

Preferably, the gap is an air gap.

Preferably, the system further includes a field lens between the image source and the optical system.

Preferably, the first optical element comprises a substantially concave surface.

Preferably, the substantially concave surface is optically coated to be substantially reflective.

Preferably, at least one of the powered surfaces on the first optical element is described by a multiple order polynomial.

Preferably, one of the angles is less than 30°.

Preferably, the first and second optical elements are of different materials.

According to a second aspect of the present invention there is provide a display comprising a folded optical arrangement according to another aspect of the invention.

Preferably, the display is in the form or at least one of a head mounted display, a head worn display and a heads up display.

BRIEF DESCRIPTION OF THE DRAWINGS

Embodiments of the invention will be described, by way of example, with reference to the following drawings, in which:

FIG. 7 is a simplified diagram for showing the angular orientations of the optical system, according to an aspect of the present invention;

DETAILED DESCRIPTION

In general, the present invention relates to improvement in or relating to optical improvements for displays such as for example a head mounted displays; a head worn display; or a heads up display (HMD, HWD, HUD respectively). In particular, the present invention relates to a folded optical arrangement for use in a display to transmit images from an image plane to a user's eye, and to a display incorporating the folded optical arrangement.

Figure 4:
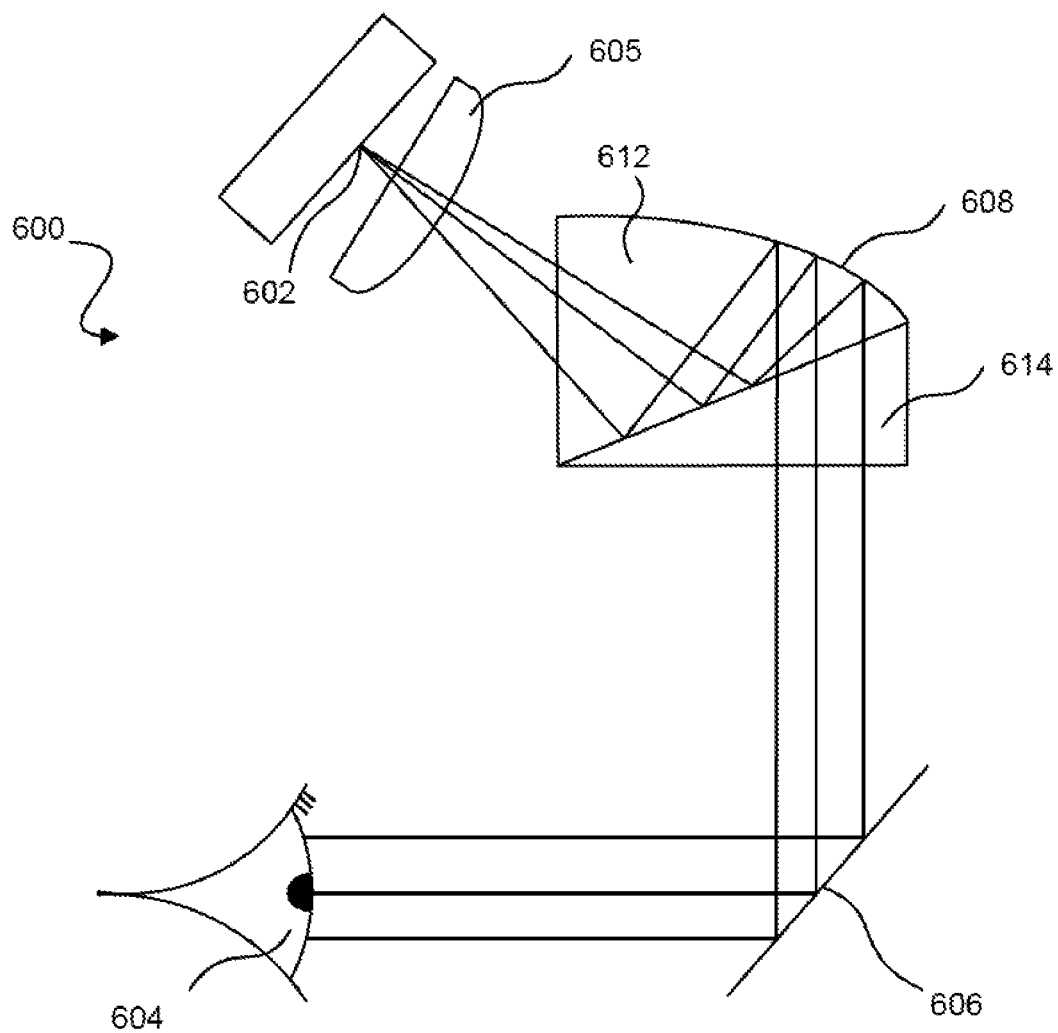
FIG. 4 is a simplified cross-sectional diagram of a folded optical arrangement according to an embodiment of the invention

FIG. 4 shows a simplified cross-sectional of a folded optical arrangement 600 according to an embodiment of the invention. FIG. 4 shows the path of light rays through the optical arrangement 600 from an image source 602 to a user's eye or an eyebox 604, and from the exterior environment 606 to the user's eye 604 via a combiner element 609.

The optical arrangement 600 comprises an optical system 608, also described as focusing optics and forms an image from the image source 602 towards the optical system 608 via an optional field lens 605. The optical system 608 receives the light forming the image. The light is focused by the optical system 608 and the focused light is output from the optical system 608. The focused light is incident on combiner element 609 which transmits the focused light towards the location of the user's eye 604. The light may be focused at infinity, or at any other predetermined focal point.

For the purposes of the figures, it will be assumed that the user's eye or an eyebox 604 is in the location shown, and references to the user's eye should be interpreted to mean that the typical use case is being described. However, it will be appreciated that the user's eye is not required for the invention to operate according to the principles set out herein. The optical arrangements described below ultimately generate exit pupils in the direction of an assumed position of the user's eye when the device is in use, regardless of where the user's eye actually is.

Figure 5:
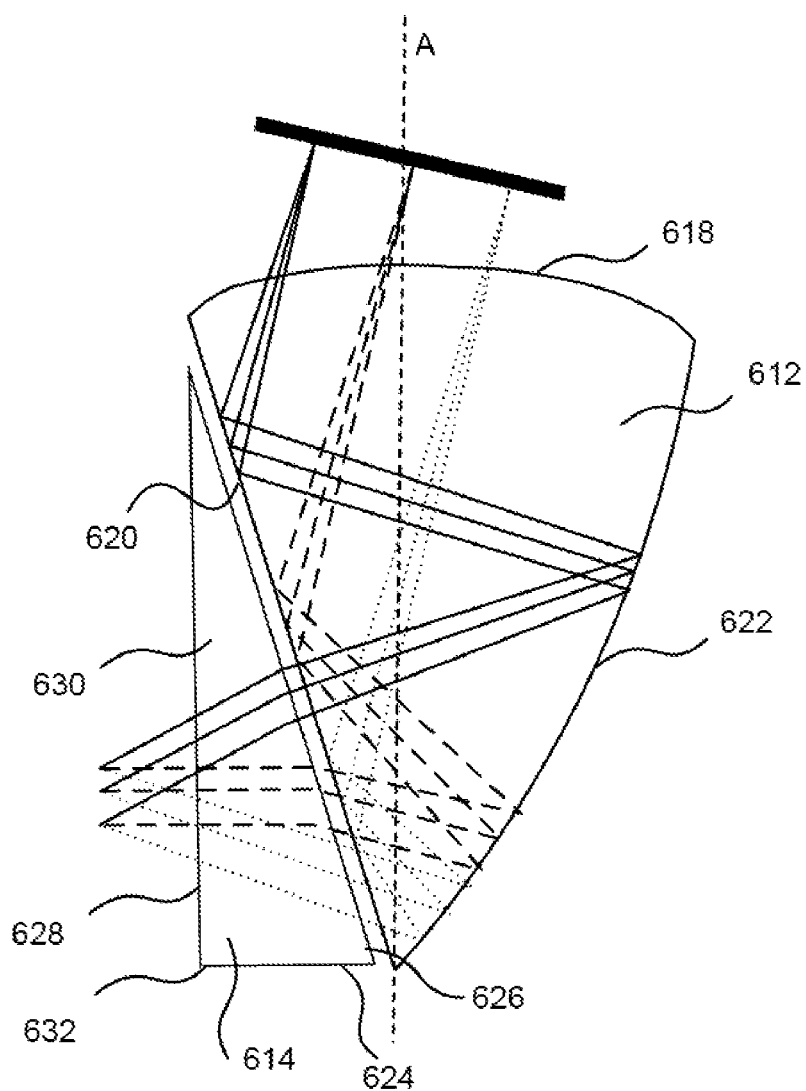
FIG. 5 is a more detailed cross-sectional diagram of the optical system of FIG. 4, according to an aspect of the invention.

An enlarged representation of the optical system 608 is shown in FIG. 5. The optical system 608 comprises a first optically powered optical element 612 (hereinafter referred to as a prism element) and a second optically powered element 614 (hereinafter referred to as a wedge element). The prism element 612 and wedge element 614 operate as an optical lens system, to focus the light for viewing by a user. The prism element 612 and wedge element 614 may also be configured to optimise or counteract unwanted optical aberrations that are typically introduced by optical lens arrangements. For example, surface features of the prism element 612 and/or wedge element 614 may be configured to reduce aberrations and/or correct any other optical defects. The use of the two elements, whilst maintaining a space, such as an air space, between the elements allows the optical system to operate as an spaced optical doublet to improve chromatic correction. Furthermore a third optical element, such as a field lens 605 as shown in FIG. 4, may be added between the prism element 612 and image source to provide additional optical correction.

In the present invention the prism element as referred to throughout is used for ease and is not intended to be a limitation as to the form and shape of the element 612. The prism element is thus intended to include any optical element comprising a plurality of optically powered surfaces. This could be a three surface prism or may have two or more surfaces. The preferred form is a three surface prism, but other shapes and forms are equally applicable. Similarly the wedge element is used of ease of reference but could be different shapes and forms. The wedge element is thus intended to include any optical element comprising one or more optically powered surfaces.

The combination of the prism element and the wedge element define a plurality of interfaces between the optical powered surfaces of each element. As light passes through the combination (also referred to as the optical system) and as a result of the interfaces there is a change in refractive index, which leads to a change in direction of the light passing through the interface. This enables light beams to be directed by the combination. Due to the relative positioning of the prism and wedge there are different interfaces and different shapes of interface this helps define a "folded path" through the optical system.

The prism and wedge elements may be in direct contact or have a gap between their surfaces. The gap can be an air gap or may comprise other material such as glue etc. The addition of the gap adds a further interface (for example, from the prism to air; from air to the wedge and so on). The further interfaces have effect of further directing the light. The overall light direction will be described in greater detail below. The result of the combination is that due to the multiple interfaces light can be guided in a very controlled manner and in a component that is compact and light as is the optimum for head mounted optics. The juxtaposition of the first and second optically powered elements (with or without a gap) define a compact folder path through which light can be directed.

The optical system 608 produces a focused exit pupil that is well corrected whilst maintaining a low volume and size. As used herein, 'well-corrected' is intended to mean that defects of the light, such as aberrations, artefacts, chromatic distortion, are minimised in order to provide a predefined standard of optical performance which may be different for different applications.

Figure 9A:
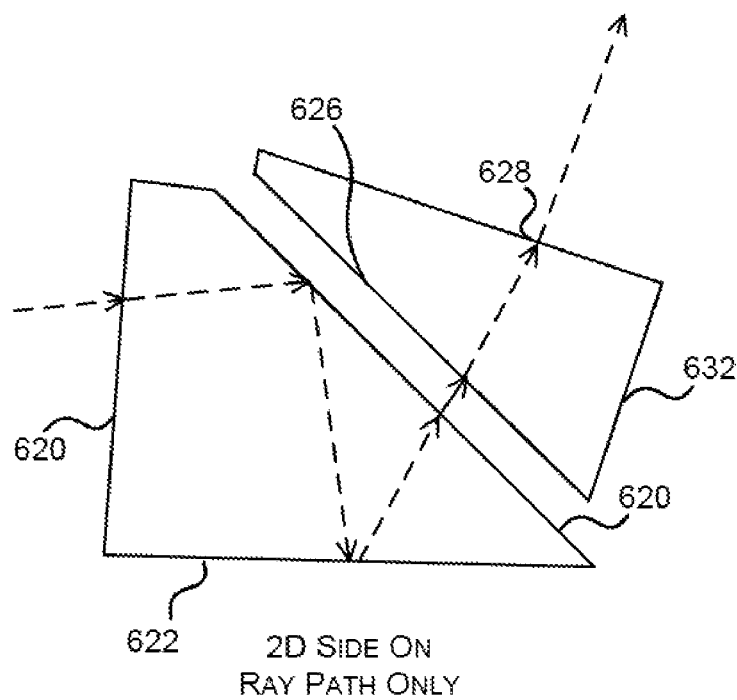
FIGS. 9A and 9B are representations of combinations of the prism and wedge.
Figure 9B:
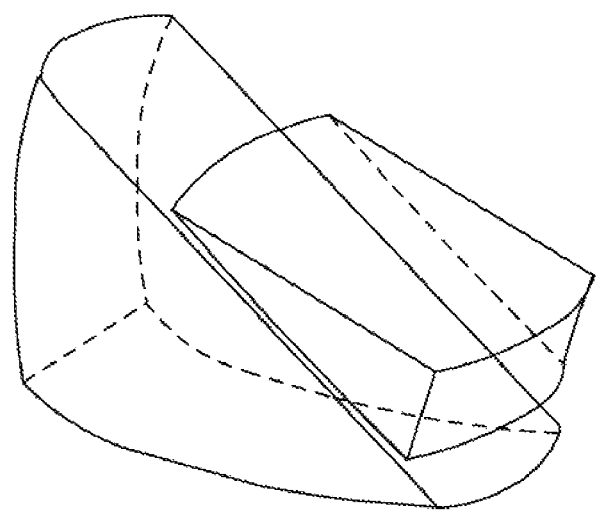

The prism 612, a 3D representation of which is also shown in FIG. 9B, is a single-piece three-sided element having by way of example an elongate, substantially triangular cross-section. The prism 612 therefore has two three-edged bases (only one of which is shown in FIG. 9) 616 and three surfaces 618, 620, 622 joining corresponding edges of the two bases 616. Any number of the surfaces 618, 620, 622 of the prism 612 are optically powered and the surface powers may be different from one surface to the next. In the embodiment of FIG. 5, the prism element 612 and wedge element are separated by a gap 624 such as for example an air gap. The gap 624, wedge 614 and prism 612 may be of any combination of materials and as each may be different the interfaces between the three can provide a difference in refractive index from one element to the next. This can be exploited in the present invention to control the direction of light passing through the combination of elements. The gap may be formed from any type of spacing material having a different refractive index than the other elements. In FIG. 5 example, the prism 612 is surrounded by air, which has a lower refractive index than the other elements. Many other different combinations of material can be used.

The operation of the prism element 612 alone and in combination with the wedge element 614 and the gap 624 will now be described. Light from the image source 602 enters the prism element 612 at a first, receiving surface 618, in some examples via a field lens. The receiving surface 618 is optically powered, and may be described by a spherical, aspherical, cylindrical, toroidal or multiple order polynomial surface shape.

The light travels through the prism element 612 and undergoes Total Internal Reflection (TIR) at a second surface 620. The TIR occurs because the surrounding material, air, has a lower refractive index than the material of the prism 612 and because the angle of incidence of the light is greater than the critical angle for the interface at the surface 620 between the prism element 612 and the air. The surface 620 is also optically powered and may be described by a spherical, aspherical, cylindrical, toroidal or multiple order polynomial surface shape. It should be noted that partial internal reflections or a reflection due to a reflective coating may be used instead of TIR, however these may be less efficient.

The surface 620 is tilted relative to a central axis A of the prism 612. Tilting the surface 620 relative to the normal axis can help to reduce TIR breakdown that would occur if the transmission surface were aligned closer to the normal axis. Tilting the surface 620 in this way beneficially enables the image plane to be oriented at a shallower angle relative to the normal axis, permitting a more compact arrangement.

By virtue of having undergone TIR at the surface 620, the light is reflected towards the reflective surface 622. The reflective surface 622 is also optically powered and may be described by a spherical, aspherical, cylindrical, toroidal or multiple order polynomial surface shape. The reflective surface 622 is optically coated to reflect light. Light reflected within the prism 612 towards the reflective surface 622 therefore experiences the reflective surface 622 as a second surface mirror. The reflective surface 622 may be not tilted or minimally tilted relative to the normal axis A to reduce off axis aberration. The light reflected by the coating applied to the reflective surface 622 returns toward the surface 620.

The light reflects from the reflective surface 622 and is re-incident on the surface 620 at an angle that is less than the critical angle for the interface at the surface 620 between the prism element 612 and the air, so the light is transmitted through the surface 620 and exits the prism element 612. The light exits the prism element 612 and travels into the gap 624 between the prism element 612 and the wedge element 614.

The light travels through the gap 624 and enters the wedge element 614. The refractive index of the air in the gap 624 is lower than the refractive index of the material of the wedge element 614. The wedge element 614 is for example, an elongate element having quadrilateral cross-section, and so has two surfaces 626, 628 connected by upper and lower ends 630, 632. The surfaces 626, 628 and ends 630, 632 extend between bases (not shown in FIG. 6). The wedge element 614 may also take a substantially triangular cross section, without an upper end 630.

The wedge element 614 receives light from the gap 624 at the first, input surface 626. The light leaves the wedge 614 at the second, output surface 628.

In the embodiment of FIG. 5, the input surface 626 of the wedge 614 may also be described by a spherical, aspherical, cylindrical, toroidal or multiple order polynomial surface shape. The light is transmitted through the wedge 614 from the input surface 626 to the output surface 628.

The output surface 628 is typically planar but may also be described by a spherical, aspherical, cylindrical, toroidal or multiple order polynomial surface shape. At the output surface 628, the light exits the wedge element 614 because the light is incident on the output surface 628 at an angle that is less than the critical angle for the surface. The light that exits the wedge element 614 is now focused and forms a well corrected exit pupil.

The shape of surfaces that may be a polynomial or extended polynomial shape as mentioned above may be modelled by determining parameters of the lens. One parameter that is used is a determination of the surface sag. The surface sag for the surfaces that use this surface form could (for example) be described by the following equation, which perturbs a conic aspheric surface by adding additional polynomial terms.

$$Z = \frac{cr^2}{1 + \sqrt{1 - (1+k)c^2 r^2}} + \sum_{i=1}^{N} A_i E_i(x, y)$$

Where
c=base surface curvature
r=base surface radial distance
k=base surface conic constant
N=number of polynomial coefficients
$A_i$ is the coefficient on the $i^{th}$ polynomial term.

It will be appreciated that this is just one example of modelling the surfaces; other may equally well be used.

Light that has exited the wedge element now interacts with a combiner element 609 as shown in general in FIG. 4 and more specifically in the examples of FIG. 6A to 6D. The combiner element 609 allows the user of the system to view the light from the optical system 608 simultaneously with light from an outside world scene.

Figure 1:
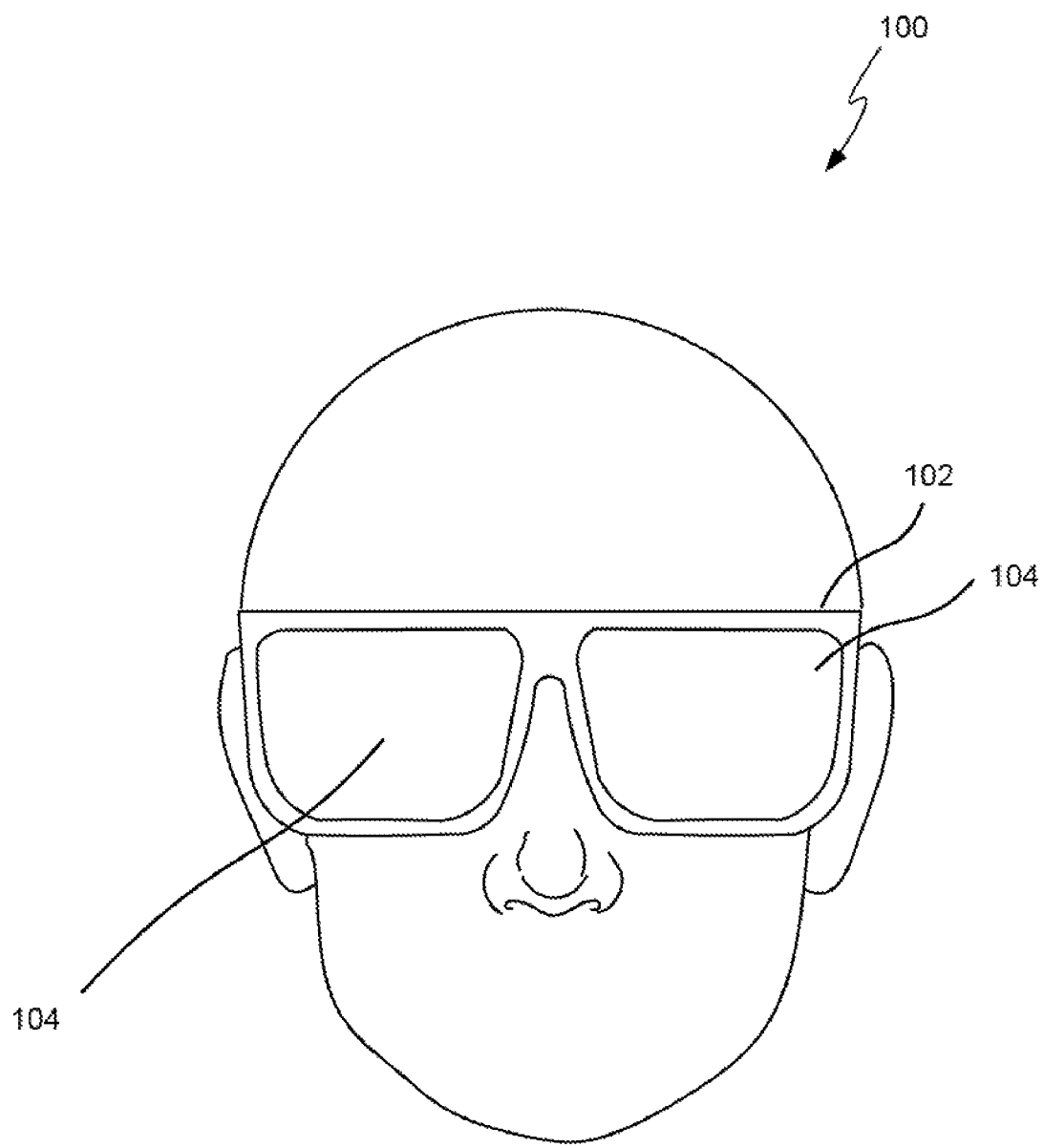
FIG. 1 is a representation of a head-mounted display.
Figure 2:
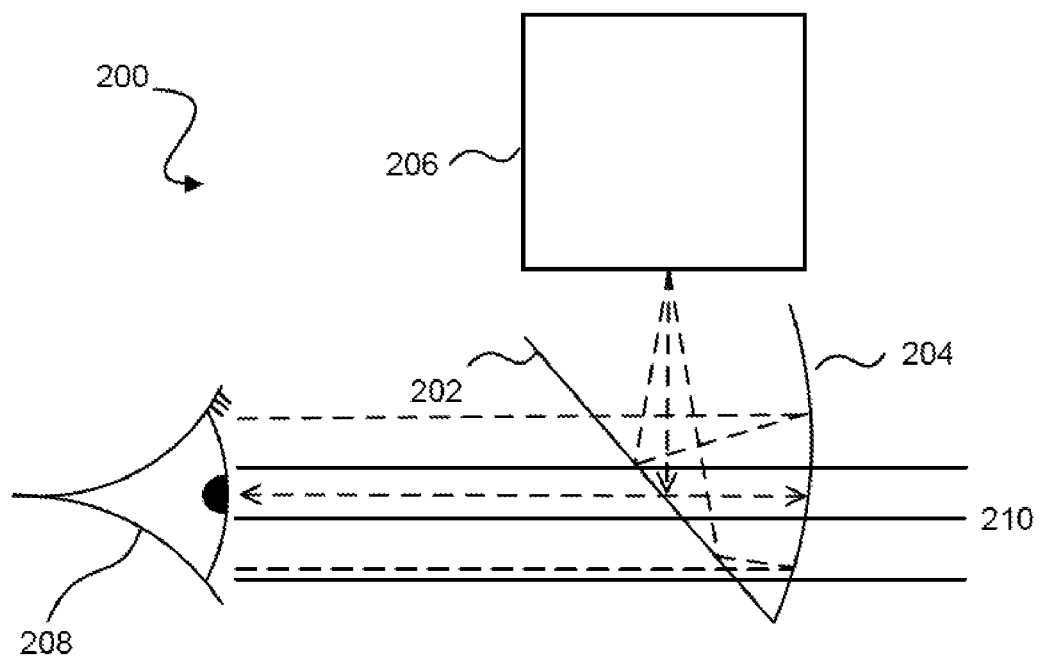
FIG. 2 is a cross-sectional diagram of a conventional optical arrangement.
Figure 3:
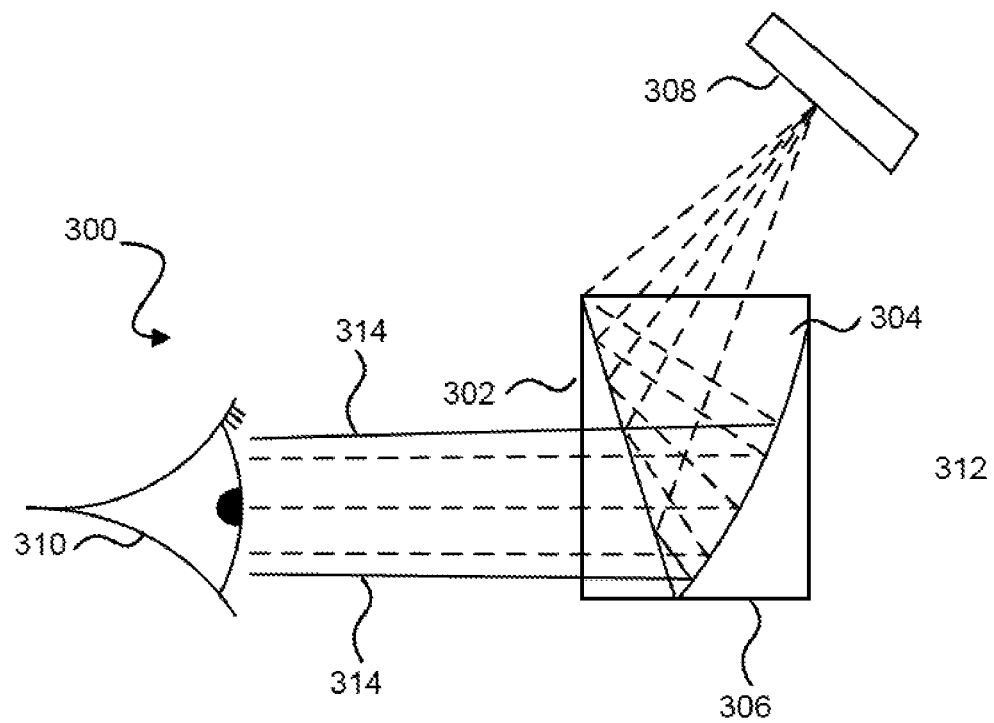
FIG. 3 is a cross-sectional diagram of a conventional off-axis solid optical arrangement.

In this scenario, a makeup piece as shown as element 306 in FIG. 3 is not needed and the user does not view the combined generated image and outside world scene through the combined prism assembly, but instead via the combiner element 607. By viewing the outside world through a combiner element the user does not have to look through a thick and powered optical element. This can help to mitigate issues encountered with the external view from the outside world being distorted after the light from the outside world has been transmitted through a thick, powered optical element, which can induce refractive errors.

The combiner element 609 may comprise optical power and can be reflective, refractive, holographic or diffractive. In the case of a reflective element, the surface form of the combiner may be typically planar to reflect light output from the wedge element 614 toward an exit pupil for viewing by a user. The surface of the combiner would be optically coated with a metallic or dielectric coating to facilitate reflection of light. Alternatively, a reflective combiner could also be formed so as to have optical power; the surface form may be described by a spherical, aspherical, cylindrical, toroidal or multiple order polynomial surface shape.

Figure 6A:
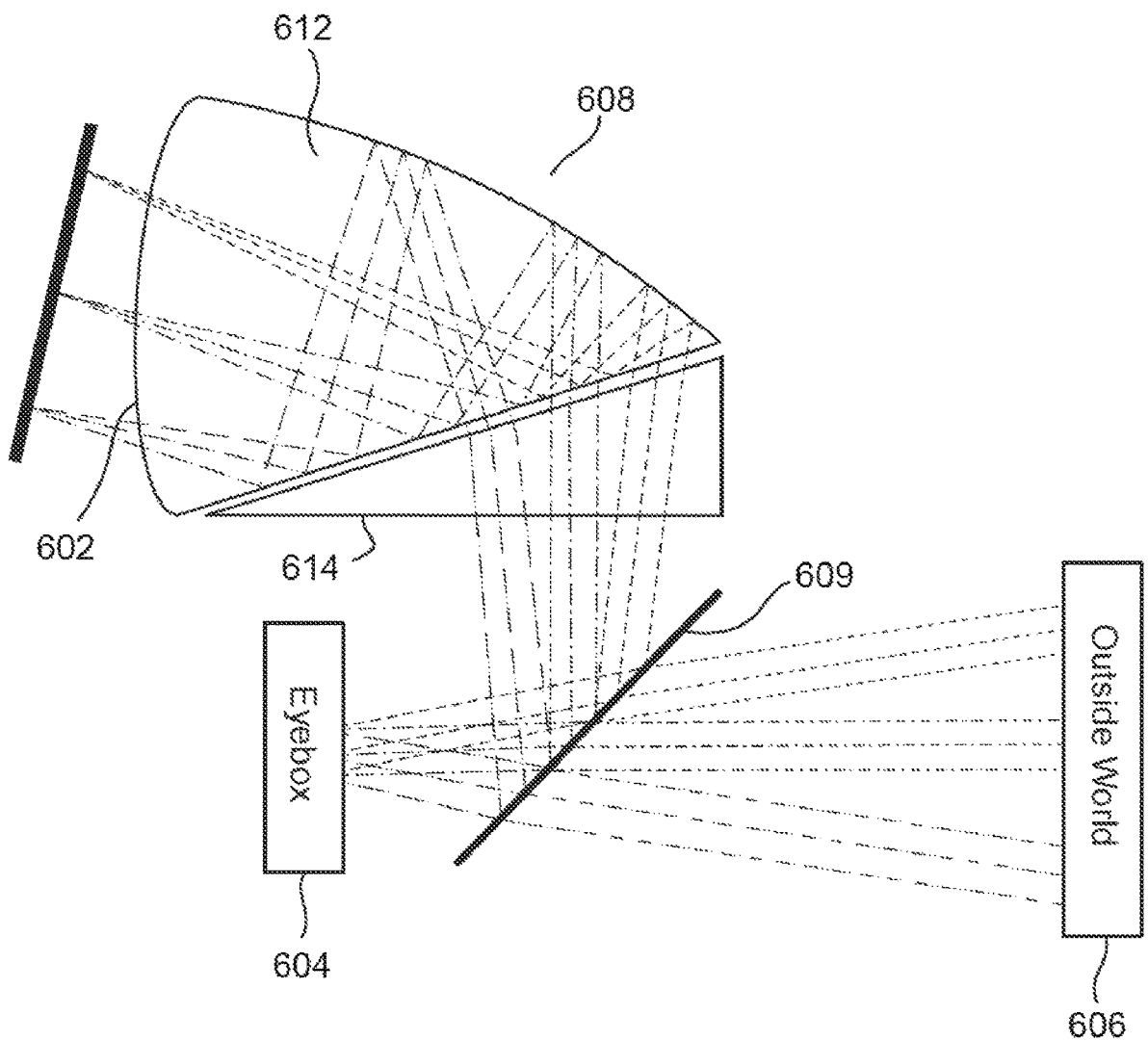
FIGS. 6A to 6D are more detailed cross-sectional diagrams of a folded optical arrangement according to a number of embodiments of the invention.
Figure 6B:
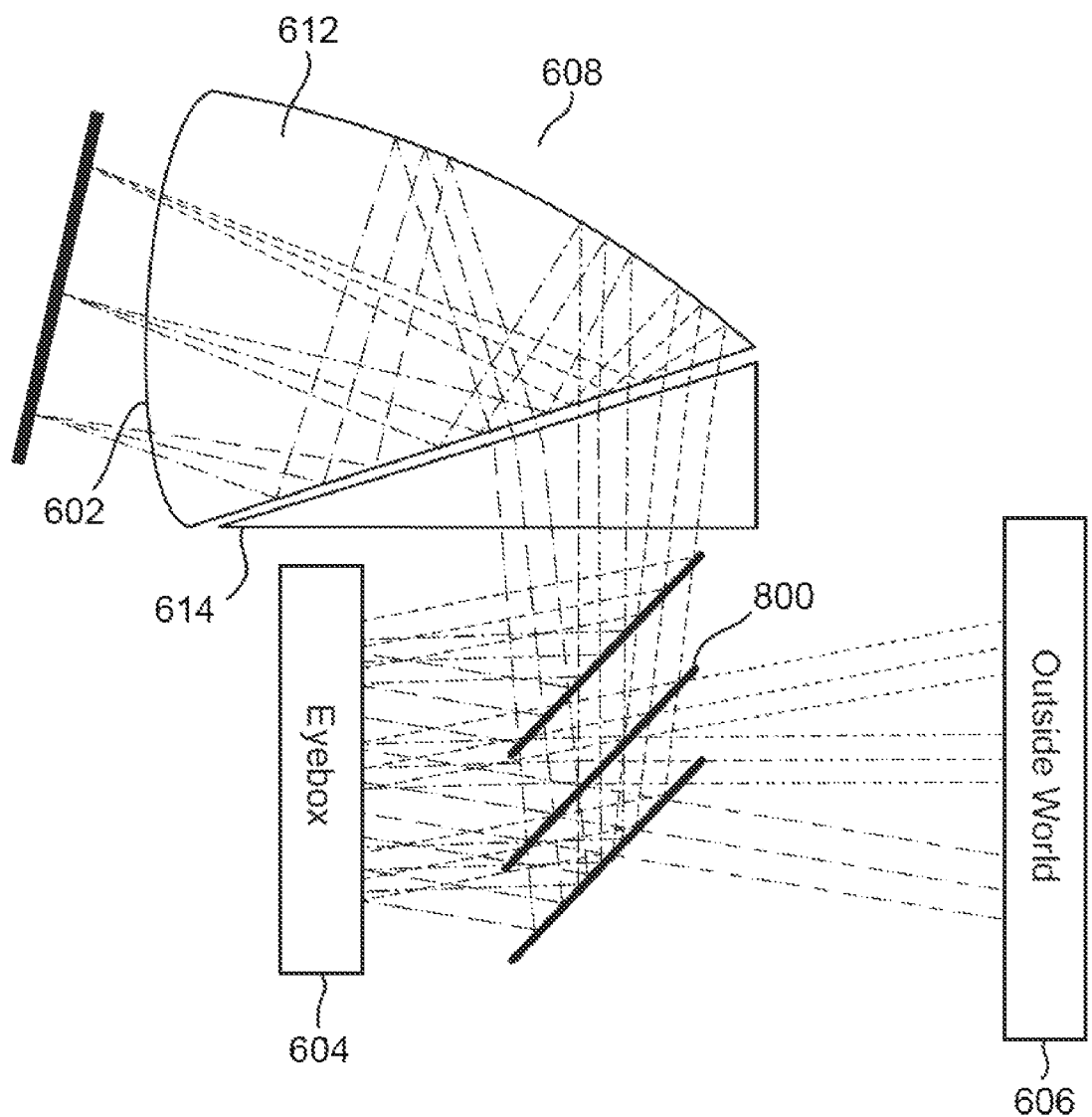
Figure 6C:
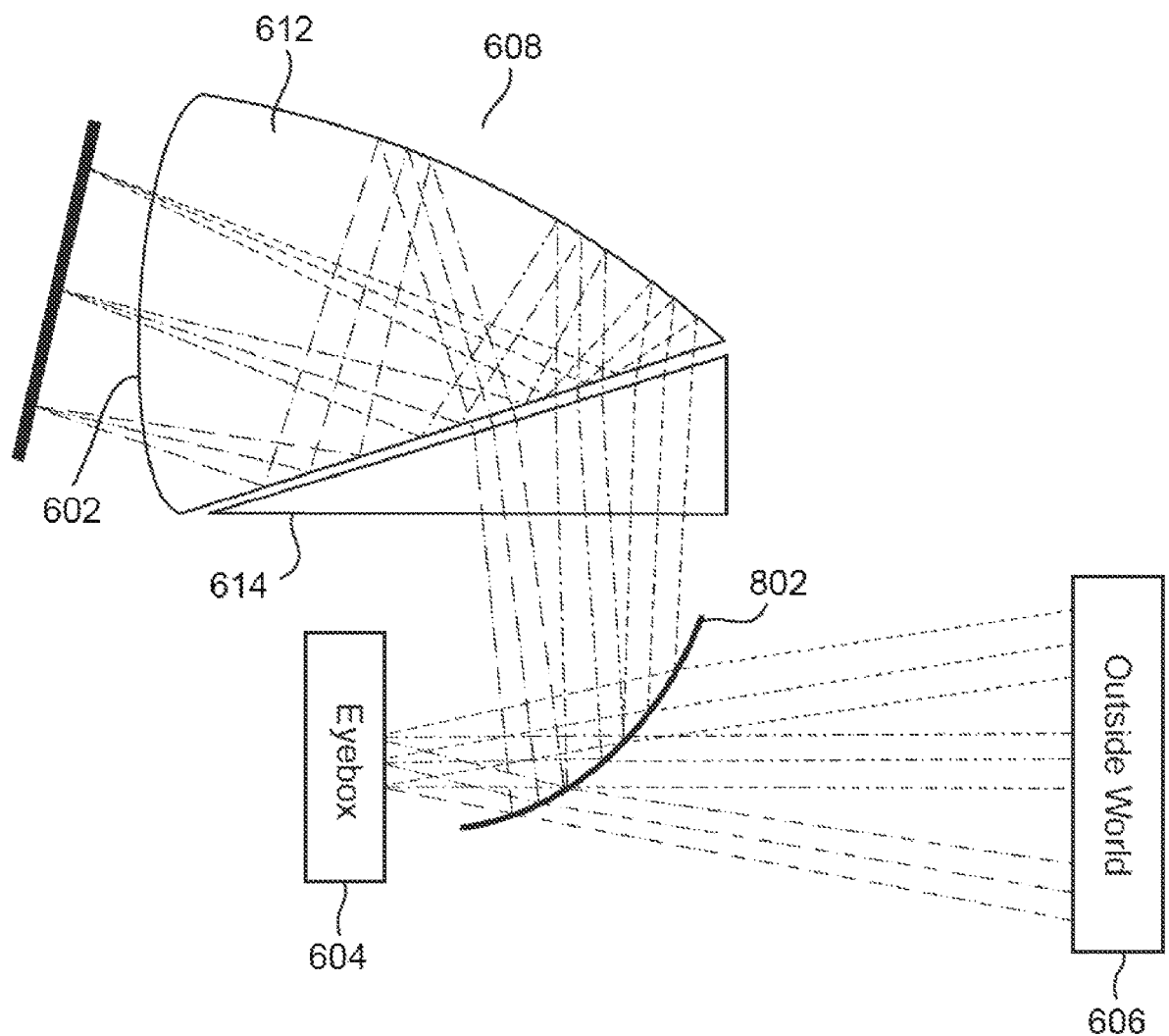
Figure 6D:
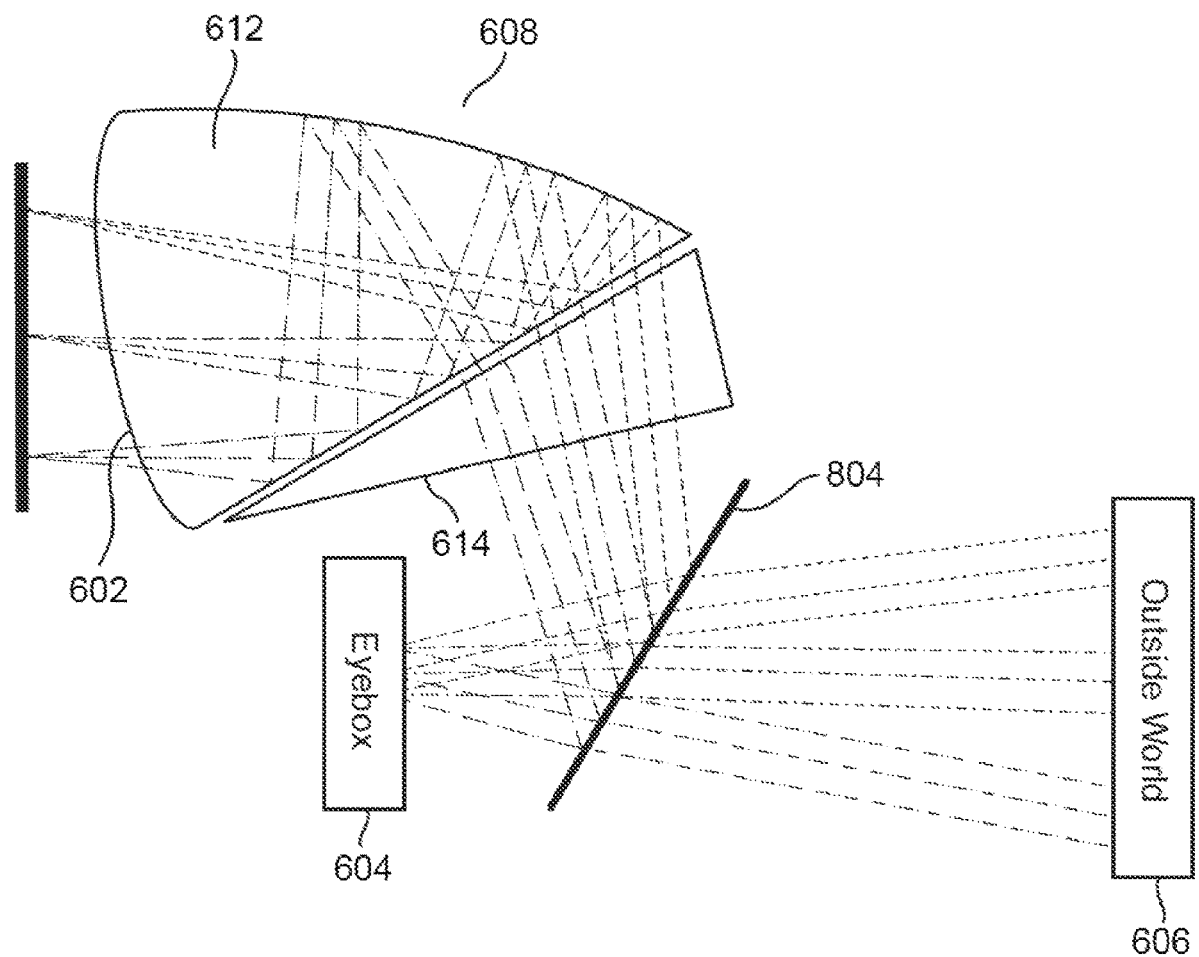

FIGS. 6A to 6D shown examples of different types of combiner element 609 which could be used in conjunction with optical system 608. FIG. 6A shows the combination folded optics with a reflective combiner 609. FIG. 6B shows the combination folded optics with a stacked reflective combiner 800. FIG. 6C shows the combination folded optics with a powered reflective combiner 802. FIG. 6D shows the combination folded optics with an off axis holographic combiner 804. Many other types of combiner element could be used and it will be appreciated these are merely by way of example.

A holographic or diffractive combiner would have a further advantage by leveraging holographic or diffractive power on the combiner surface, so as to work beyond the conventional laws of reflection. A holographic or diffractive combiner would allow alternative geometries to be constructed, through means of alternative paths of light (see FIG. 6D) from the optical wedge, 614 to the eye.

Through the use of a powered combiner a further degree of freedom is introduced into the optical design, which can improve optical performance by allowing further correction of the image light, so as to minimise optical aberrations present in the final display image (see FIG. 6C). Furthermore, the introduction of a combiner allows the geometry of the system to be further folded facilitating increased tailoring to bespoke optical layouts.

Additionally, multiple stacked combiner elements may be used to expand the eyebox of the system (see FIG. 6B). By stacking multiple combiner elements, which are all partially reflective and spaced from each other by air, the light output from wedge 614 can be split into multiple successive rays. The combiner elements can be made partially reflective through the use of a metallic or dielectric coating. The light that is reflected from the multiple combiner elements will be directed toward the eyebox of the system. Due to the fact that rays are split at each combiner interface, multiple rays are generated from one source ray (output from wedge 614), consequently the light output from the wedge 614 can be spread over a larger spatial area, thus expanding the size of the eyebox of the system.

The prism element 612, gap 624, wedge element 614, and combiner element 609 provide a number of degrees of freedom that are used to manipulate the light in order to result in focused, well-corrected exit pupil. The focused light exits the optical system after interaction with the combiner 609. In some embodiments, further components may be incorporated to increase the number of degrees of freedom of the arrangement and light may enter or exit the optical system via a different component. For example, an additional optical element, a field lens, may be incorporated into the optical system 608 to further reduce residual aberrations such as distortion and/or field curvature. In some embodiments, a further corrective element may be incorporated in the optical system 608 to chromatically correct the light. These elements could include additional refractive, reflective, holographic or diffractive optical components to further manipulate the source light for the purpose of improving or enhancing optical performance in conjunction with the prism and wedge optical elements.

Moreover, any of the three surfaces 618, 620, 622 of the prism element 612 and either of the two surfaces 626, 628 of the wedge 614 may have varied optical power and surface forms. In some embodiments, the optical properties of the surface 620 of the prism element 612 and the input surface 626 of the wedge element 614 may be matched or designed to be complimentary for specific applications. In some examples the input surface 626 of the wedge element 614 and the surface 620, i.e. the adjacent surfaces, of the prism element 612 may have a shape that is not geometrically matched, and/or that is dissimilar. In some examples adjacent surfaces may be non-complementary or non sympathetic, such that there is no way to place the surfaces together without leaving a gap.

A non-complementary shape or dissimilar shape allows an additional optical surface form for correction of aberrations.

The materials of the prism element 612, wedge element 614 and the combiner element may be the same or may be different to take advantage of the optical characteristics such as refractive indices that different materials have. Similarly, the surrounding material and/or spacing material of the gap 624 are variable to optimise the optical characteristics of the optical system 608. Materials for the optical elements can be of any appropriate nature. For example, the materials may comprise one or more of optical glasses, polymers and plastics of varying refractive index and abbe number may be used, such as: N-BK7 (low index glass), N-SF6 (high index glass), 7980_0F (low index fused silica), PMMA (low index polymer) and E48R (low index polymer). It may be advantageous to have both optical elements made from different materials so as to combine materials with different indices and different dispersion characteristics. For example, the optical wedge may be manufactured from a material with low dispersion to mitigate chromatic splitting of light during the interaction with the powered surface.

The folded optical arrangement 600 described above is particularly beneficial for use displays such as in head-mounted displays etc. For the user to view the external environment, light from the external environment needs to only travel through the combiner to reach the user's eye. In addition, the optical system 608 can be specifically designed to improve the quality of the image displayed to the user because the user does not have to view the external environment through the optical system 608.

The folded optic can be further enhanced by an additional optional field lens or other optical elements before the combined prism or between the combined prism and combiner. These elements could include additional refractive, reflective, holographic or diffractive optical components to further manipulate the source light for the purpose of improving or enhancing optical performance in conjunction with the prism and wedge optical elements.

FIG. 7 shows a simple representation of the prism element 612 and the wedge element 614 to show example angular orientations. It should be noted that in FIG. 7 the surfaces of the elements are represented as flat for convenience, however the surfaces may be curved as is described with reference to FIGS. 4 and 5. FIG. 7 shows a normal 900 relative to a wedge surface 628, from which the light exits the optical system. The normal is located at the centre of surface 628 and crosses surface 628 at point K. The normal extends to a point L where it intersects surface 626; to a point M where it intersects surface 620; and to a point N where it intersects surface 622. In addition, two angles are indicated 902 for the prism element and 904 for the wedge element. Angle 902 is defined by surfaces 622 and 620 whilst angle 904 is defined by surfaces 628 and 626. The angle 904 can be determined based on the tangent of its angle. The tangent of angle 904 being:

$$\text{Tan (angle 904)} = KL/JK$$

Surfaces 620 and 626 are referred to herein as the adjacent surfaces of the respective wedge element and prism element as these are adjacent to one another in the normal orientation of the optical system 608. One of the angles (902, 904) is defined at one end of the adjacent surfaces and other is defined at the other end of the adjacent surfaces. In other words, the angles are at opposing end of the adjacent surfaces. The interface between the adjacent surfaces is referred to herein as the adjacent interface.

The two angles can be varied to obtain an optimal orientation of the two elements which in turn give rise to optimal optical properties for the optical element 608. The angular difference between the two angles is predetermined and in general, the angles are not equal and angle 904 is less than angle 902. The specific angles are not essential but the angular difference is determined to ensure the correct path for the light coming from respective sources. By way of example angle 904 could be for example less than 30°.

Figure 8A:
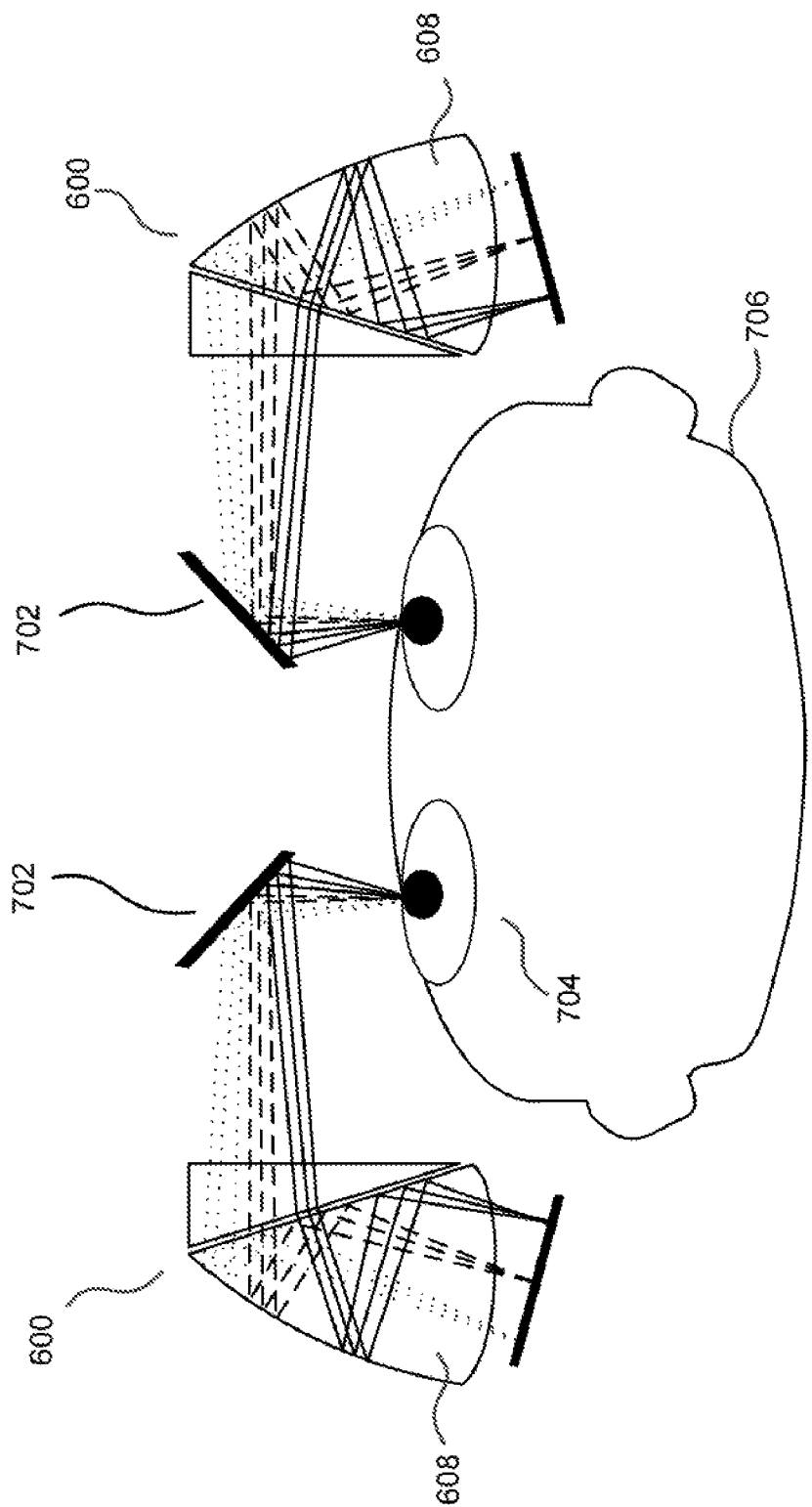
FIGS. 8A to 8C are representations of a number of different orientations of positioning of an optical arrangement of the present invention relative to a user from different directions.
Figure 8B:
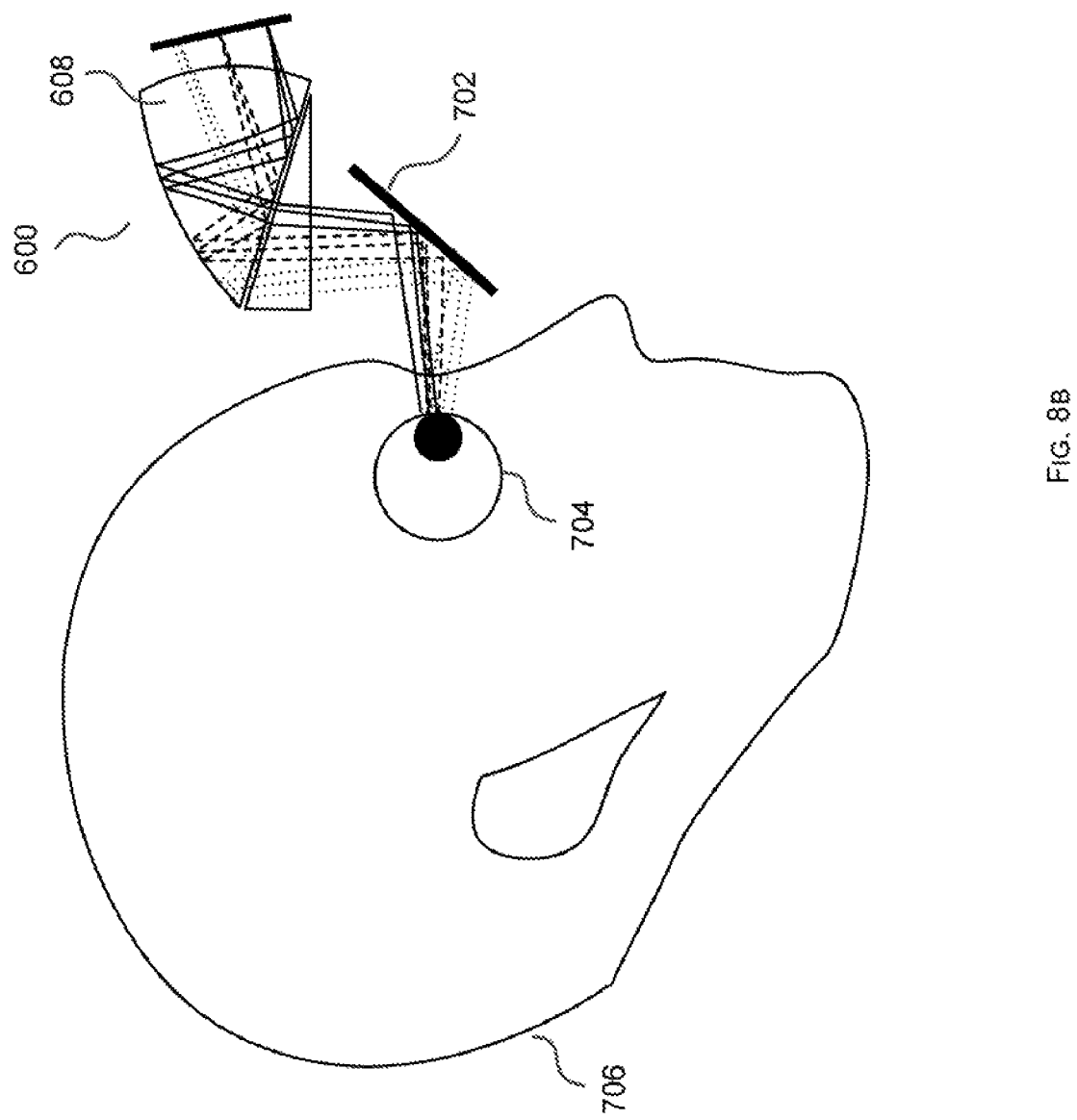
Figure 8C:
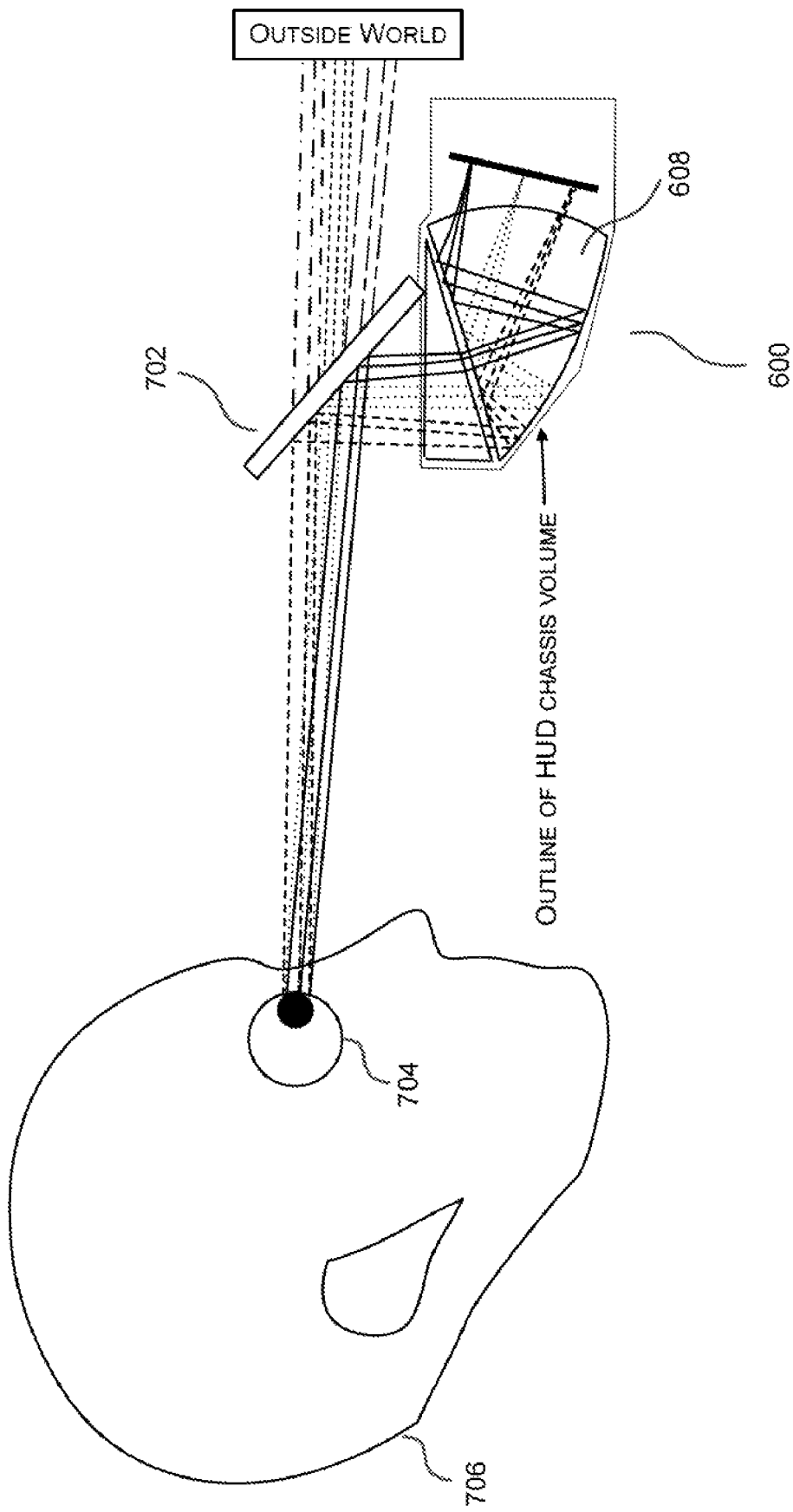

Referring to FIG. 8A to 8C if the display is an HMD, a HWD it is wearable by means of an appropriate support, or a HUD. The support may contain one or more optical systems 600 which can be viewed by one or both eyes 704 of the user. The HMD may further include a control system.

The optical element 608 may be located relative to the arc or shape of the head 706. In FIG. 8A a view from above is shown and in FIG. 8B a side view is shown. FIG. 8C shows a possible HUD orientation. It will be appreciated there are many alternatives to the arrangements shown.

For use with or as the invention, the HMD can be of any appropriate type including googles, glasses, a helmet or helmet visor suitable for use in multiple fields. Ideally, the device is portable or adapted to be portable by means of the support. Although not shown in detail the support may include a support adapted to support the optical elements 608 in front of the eye. The support may include: frames; side arms and supports for goggles and glasses; a helmet or visor; a headband; a neck or shoulder worn support; a gaming headset; or any other support that could be worn to hold the optical elements in the desired position.

The control system is variable depending on the use of the HMD. The control unit may be in situ or remote from the HMD. The control device may include a communications module for communicating with the optical elements and with other modules either on the HMD or remote therefrom. The communications may be wireless and/or wired. The control module may include different modules for carrying out different functions. These functions are not limited in any way but may include imaging, tracking, scene generation, processing, storage, power supply, audio etc.

To display images to the user via the optical arrangement, the HMD also incorporates an image source corresponding to the optical arrangement. The image source may have a controlled numerical aperture or an uncontrolled numerical aperture and may comprise a flat panel display, emissive display, a reflective display, a projection optic, a relay lens or any other type of display source, image or light generation unit.

In an alternative, the user may use a heads up display as shown in FIG. 8C.

FIGS. 9A and 9B show respectively a 2D view of the combination of the prism and wedge with the ray path shown and a 3D view of the combination of the prism and wedge with optically powered surfaces shown.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A folded optical arrangement for use in a look-through display to transmit an image from an image plane to a user's eye, the arrangement providing a folded optical transmission path and comprising:
    an optical system having a first optical element and a second optical element, the first optical element comprising a first plurality of optically powered surfaces, and the second optical element comprising at least one optically powered surface, the optical system configured to receive light forming the image from an image source, and to focus the light to have an apparent optical focus between a predetermined distance and optical infinity and output the light; and
    a combiner element located to receive the output light from the optical system and a further external image for combination for transmission to the user, wherein the combiner element comprises an optically powered surface;
    wherein the first plurality of optically powered surfaces and the at least one optically powered surface are arranged to define a plurality of interfaces along the folded optical path and wherein a refractive index change at each interface is predetermined to control the direction of light passing through the or each interface; and
    wherein one surface of the first optical element and one surface of the second optical element are adjacent to one another and the adjacent surfaces are dissimilar and each define an angle with another surface of the respective optical element at an opposing end of the adjacent surfaces so as to provide opposing angles, and wherein the opposing angles are not equal.

2. The folded optical arrangement of claim 1, wherein the combiner element comprises a plurality of stacked combiner elements to expand the effective exit pupil of the system.

3. The folded optical arrangement of claim 1, wherein the combiner element comprises at least one of a reflective, refractive, holographic, and/or diffractive element.

4. The folded optical arrangement of claim 1, wherein the first optical element comprises at least three optically powered surfaces.

5. The folded optical arrangement of claim 1, wherein the first optical element comprises a single-piece three-sided element having an elongate, substantially triangular cross-section.

6. The folded optical arrangement of claim 1, wherein the second optical element comprising at least two optically powered surfaces.

7. The folded optical arrangement of claim 1, wherein the second optical element is a wedge.

8. The folded optical arrangement of claim 1, wherein the second optical element comprises an elongate element having quadrilateral cross-section.

9. The folded optical arrangement of claim 1, wherein the first optical element and the second optical element are arranged in juxtaposition with one another so that at least one optically powered surface of each is substantially aligned.

10. The folded optical arrangement of claim 9, wherein the at least one optically powered surface of each optical element is separated by a gap.

11. The folded optical arrangement of claim 1, wherein the first optical element comprises a substantially concave surface.

12. The folded optical arrangement of claim 1, wherein at least one of the optically powered surfaces on the first optical element is described by a multiple order polynomial.

13. A display comprising a folded optical arrangement according to claim 1.

14. The display of claim 13 in the form of at least one of a head mounted display, a head worn display, and/or a head up display.

15. A folded optical arrangement for use in a look-through display to transmit an image from an image plane to a user's eye, the arrangement providing a folded optical transmission path and comprising:
    an optical system having a first optical element and a second optical element, the first optical element comprising a first plurality of surfaces including at least three optically powered surfaces, and the second optical element comprising an elongate element having quadrilateral cross-section and a second plurality of surfaces including at least one optically powered surface, the optical system configured to receive light forming the image from an image source, and to focus the light to have an apparent optical focus between a predetermined distance and optical infinity and output the light; and
    a combiner element located to receive the output light from the optical system and a further external image for combination for transmission to the user, wherein the combiner element comprises an optically powered surface and includes a reflective, refractive, holographic, and/or diffractive element;
    wherein the optically powered surfaces of the first and second optical elements are arranged to define a plurality of interfaces along the folded optical path and wherein a refractive index change at each interface is predetermined to control the direction of light passing through the or each interface; and
    wherein one of the surfaces of the first optical element and one of the surfaces of the second optical element are adjacent to one another and the adjacent surfaces are dissimilar and each define an angle with another surface of the respective optical element at an opposing end of the adjacent surfaces so as to provide first and second angles, and wherein the opposing angles are not equal.

16. A display comprising the folded optical arrangement of claim 15, the display being in the form of: a head mounted display, a head worn display, a head up display, googles, glasses, a helmet, a helmet visor, or a gaming headset.

17. A folded optical arrangement for use in a look-through display to transmit an image from an image plane to a user's eye, the arrangement providing a folded optical transmission path and comprising:
    an optical system having a first optical element and a second optical element, the first optical element comprising a first plurality of surfaces including at least three optically powered surfaces, and the second optical element comprising a second plurality of surfaces including at least two optically powered surfaces, the optical system configured to receive light forming the image from an image source, and to focus the light to have an apparent optical focus between a predetermined distance and optical infinity and output the light; and a combiner element located to receive the output light from the optical system and a further external image for combination for transmission to the user, wherein the combiner element includes a reflective, refractive, holographic, and/or diffractive element;

wherein the optically powered surfaces of the first and second optical elements are arranged to define a plurality of interfaces along the folded optical path and wherein a refractive index change at each interface is predetermined to control the direction of light passing through the or each interface; and wherein of the first optical element and the second optical element are arranged in juxtaposition with one another so that one of the optically powered surfaces of each are adjacent to one another and separated by a gap and the adjacent surfaces are dissimilar and non-complementary and each define an angle with another surface of the respective optical element at an opposing end of the adjacent surfaces so as to provide first and second angles, and wherein the opposing angles are not equal.

18. A display comprising the folded optical arrangement of claim 17, the display being in the form of: a head mounted display, a head worn display, a head up display, googles, glasses, a helmet, a helmet visor, or a gaming headset.

19. The folded optical arrangement of claim 17, wherein the other surface of the second optical element that defines the angle with the one optically powered surface of the second optical element is a surface of the second optical element through which the light is output from the optical system to the combiner element.

20. The folded optical arrangement of claim 19, wherein the surface of the second optical element through which the light is output from the optical system to the combiner element is a substantially planar surface.

* * * * *

UNITED STATES PATENT AND TRADEMARK OFFICE
CERTIFICATE OF CORRECTION

| | | |
|---|---|---|
| PATENT NO. | : 12,158,582 B2 | Page 1 of 1 |
| APPLICATION NO. | : 17/594418 | |
| DATED | : December 3, 2024 | |
| INVENTOR(S) | : Ian Thomas Macken et al. | |

It is certified that error appears in the above-identified patent and that said Letters Patent is hereby corrected as shown below:

In the Claims

In Claim 17, Column 13, Line 15, delete "of".

Signed and Sealed this
Fourteenth Day of January, 2025

Derrick Brent
*Acting Director of the United States Patent and Trademark Office*